(12) United States Patent
Tateishi

(10) Patent No.: US 6,348,783 B2
(45) Date of Patent: *Feb. 19, 2002

(54) DC/DC CONVERTER FOR SUPPRESSING EFFECTS OF SPIKE NOISE

(75) Inventor: Tetsuo Tateishi, Kariya (JP)

(73) Assignee: Kabushiki Kaisha Toyoda Jidoshokki Seisakusho, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,054

(22) Filed: Mar. 8, 1999

(30) Foreign Application Priority Data

Mar. 9, 1998 (JP) .............................. 10-056837

(51) Int. Cl.[7] ................................. G05F 1/40
(52) U.S. Cl. ...................... 323/285; 323/284; 323/908
(58) Field of Search ................. 330/281, 141; 323/282, 284, 285, 286, 288, 287, 908

(56) References Cited

U.S. PATENT DOCUMENTS 5,247,240 A * 9/1993 Kayser et al. .............. 323/288
5,481,178 A * 1/1996 Wilcox et al. .............. 323/287
5,912,552 A * 6/1999 Tateishi ..................... 323/285

FOREIGN PATENT DOCUMENTS

JP          08-289535          1/1996

* cited by examiner

Primary Examiner—Peter S. Wong
Assistant Examiner—Gary L. Laxton
(74) Attorney, Agent, or Firm—Woodcock Washburn LLP

(57) ABSTRACT

A comparator 5 changes an output signal from [H] to [L] when a voltage drop VR occurring at a current sensing resistance Rsens becomes greater than a reference voltage VS by a current IL. When the output signal of the comparator 5 is [H], a control circuit 1 outputs a control signal of a duty ratio responsive to the voltage deviation signal outputted from a differential amplification circuit 4 to a switching element 2. When the output signal of the comparator 5 is [L], the control circuit 1 outputs a control signal, which turns off the switching element 2, to the switching element 2. When the switching element 2 is switched, the control circuit 1 connects a filter F of a large time constant to the input side of the comparator 5 by switching off a switching element Tr1 in a predetermined period of time.

31 Claims, 6 Drawing Sheets

DC/DC CONVERTER FOR SUPPRESSING EFFECTS OF SPIKE NOISE

BACKGROUND OF THE INVENTION

1. Field of the Invention

The present invention relates to DC/DC converters. More particularly, the present invention relates to DC/DC converters that prevent undesired effects when spike noise is generated within the circuit.

2. Description of the Related Art

A DC/DC converter taught by Japanese Laid-Open Publication No. 8-289535 is shown in FIG. 6 and includes a control circuit 1, a switching element 2, such as an MOS type electric field effect transistor (MOSFET), a coil L, a current sensing resistance Rsens, a capacitor C1, a differential amplifier 4 and a comparator 5. The comparator 5 outputs a "low" signal [L] when a voltage drop VR across the current sensing resistor Rsens caused by current IL is greater than the reference voltage VS. The comparator 5 outputs a "high" signal [H] when the voltage drop VR is less than the reference voltage VS.

When the output of the comparator 5 is [H], the control circuit 1 communicates a control signal to the gate of the switching element 2 with a duty ratio that is responsive to the difference between voltage V1 (obtained by dividing the output voltage Vout) and reference voltage Vref. On the other hand, when the output of the comparator 5 is [L], the control circuit 1 outputs a control signal that turns off the switching element 2.

In a voltage controlled DC/DC converter, the reference voltage VS is set to a predetermined value. Therefore, the comparator 5 operates such that the current IL is limited to a predetermined upper value regardless of the voltage difference between V1 and Vref.

On the other hand, in a current controlled DC/DC converter, the reference voltage VS is adjusted in compliance with the voltage difference between V1 and Vref. For this reason, the comparator 5 causes a large current to flow when the voltage difference is large, and operates so that the current is suppressed to a small current when the voltage difference is small.

SUMMARY OF THE INVENTION

As discussed further below, however, such DC/DC converters are susceptible to undesired effects due to spike noise generated by the coil when the switching element is switched. Therefore, it is an object of the present invention to provide an improved DC/DC converter.

In one aspect of the present invention, a DC/DC converter is taught that can adequately control the output voltage regardless of any spike noise generated when a switching element is switched and without delaying the response rate of a current limiting circuit.

In one preferred means for achieving this aspect, a DC/DC converter is taught that includes a switch (or a switching element), a coil coupled to the switch, a circuit for sensing that a current sensing signal responsive to a current flowing in the coil has become equal to or greater than a predetermined current value, a control circuit for controlling the switch in response to the output signal of the current sensing circuit and a changing circuit for preventing the current sensing circuit from operating adversely due to any spike noise generated when the switch is switched. As discussed herein, a variety of embodiments can be utilized to practice this aspect of the present teachings.

DC/DC converter circuits that have a circuit to prevent spike noise from affecting the operation are highly desirable to prevent adverse operation of the DC/DC converter. In addition, the present teachings provide DC/DC converters that can operate without delays or other interruptions.

Other objects and advantages of the present invention can be more fully understood by reading the detailed description of invention and the claims with reference to the accompanying drawings.

DETAILED DESCRIPTION OF THE INVENTION

Figure 6:
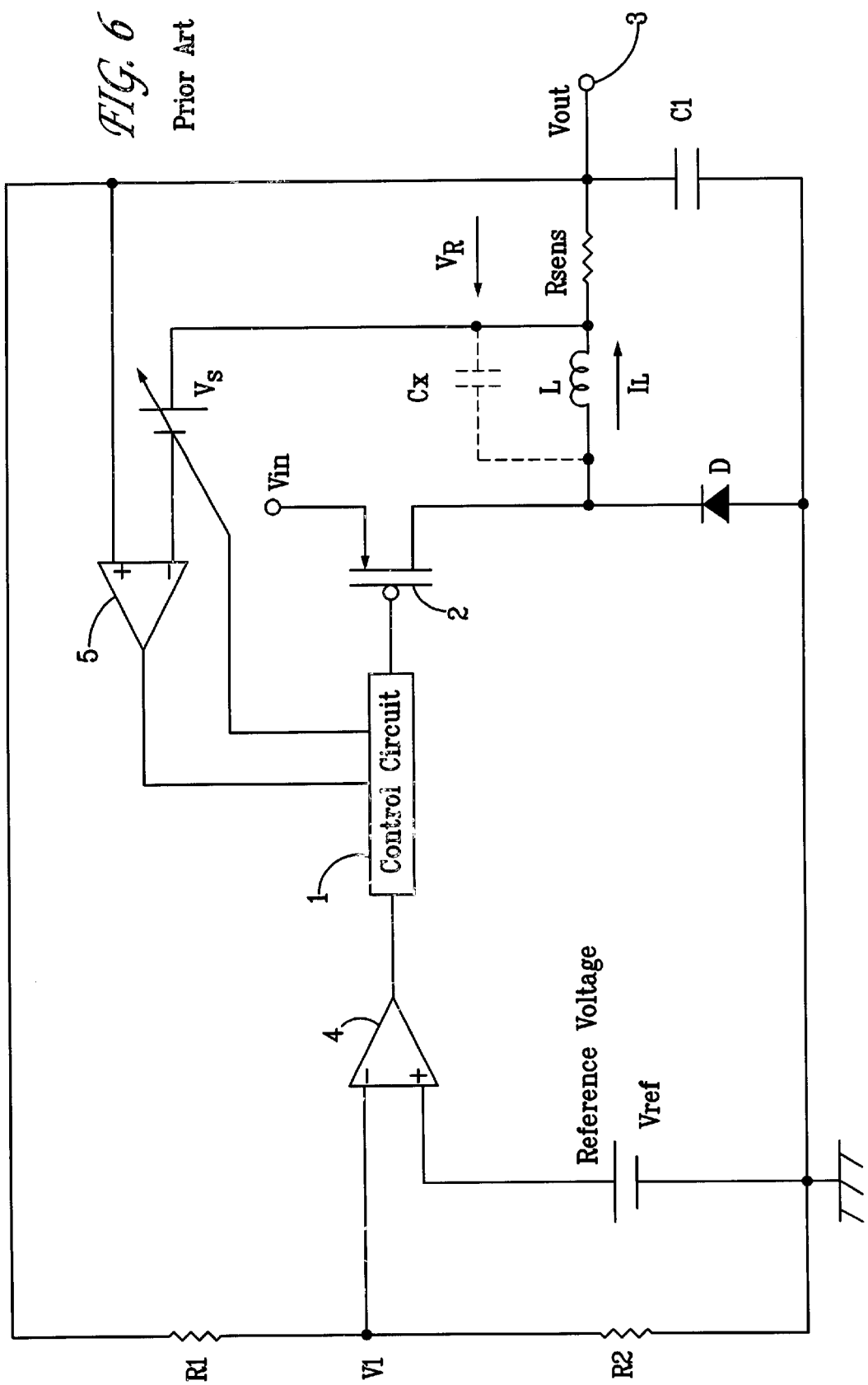
FIG. 6 is a circuit diagram of a known DC/DC converter.

In the known DC/DC converter illustrated in FIG. 6, the inventors have found that spike noise occurs at the moment when the switching element 2 is switched (from ON to OFF or from OFF to ON) in response to a control signal generated by the control circuit 1. This spike noise is believed to be the result of the inherent parasitic capacitance Cx of coil L, which parasitic capacitance is shown in broken lines in FIG. 6. When the switching element 2 is switched, the current IL flowing in the coil L changes. This current change coupled with the parasitic capacitance Cx of the coil L is believed to be the cause of the spike noise.

Figure 7:
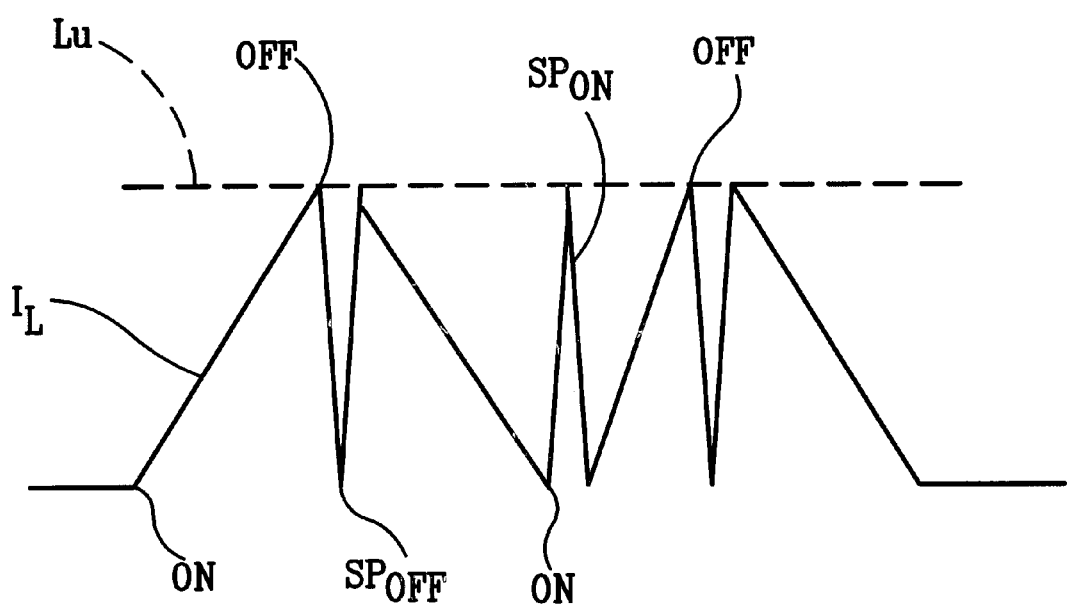
FIG. 7 is a current waveform diagram generated by the known DC/DC converter.

FIG. 7 shows how the current IL flowing through the coil L is affected in response to the spike noise. In particular, negative spike noise SPoff is instantaneously generated when the switching element 2 is switched from ON to OFF, and positive spike noise SPon is instantaneously generated when the switching element 2 is switched from OFF to ON. If the level of the spike noise SPon is too high, the current IL flowing in the coil L will instantaneously exceed the upper limit Lu of current responsive to the reference voltage VS. As a result, the output of the comparator 5 will become [L] and the control circuit 1 generates a signal that turns off the switching element 2 immediately after the switching element 2 was turned on. If the voltage difference between the voltage V1 and the reference voltage Vref is large when the switching element 2 is turned off, the output voltage Vout will not be raised. Therefore, the DC/DC converter will not operate efficiently as desired.

In order to prevent the comparator 5 from generating a low signal [L] as a result of positive spike noise SPon, a filter may be connected to the input side of the comparator 5 to absorb the spike noise SPon. However, a filter with a fixed time constant may not be suitable, because the response rate of the comparator 5 may be decreased during the usual operation of the DC/DC converter, thereby diminishing the operability of the entire circuit.

In order to overcome this problem of the known DC/DC converter, an improved DC/DC converter is taught which includes: a switch, a coil coupled to the switch, a first circuit that is capable of sensing when a current flowing in the coil becomes equal to or greater than a predetermined current value, a second circuit that can communicate switching signals to the switch based upon an output signal of the first circuit and a third circuit that prevents the first circuit from operating adversely as a result of spike noise generated by the switch. Preferably, this third circuit suppresses the effects of spike noise, but does not substantially adversely affect the overall performance of the DC/DC converter.

Various embodiments of this preferred embodiment may be constructed without departing from the spirit of these teachings. For example, the third circuit may delay the response speed of the first circuit when the switch is operated. The DC/DC converter may include a filter circuit connected to the input of the first circuit and the third circuit may function to increase the time constant of the filter circuit when the switch operated. However, when the switch is not operated, the time constant of the filter is reduced to improve the response rate of the first circuit.

The third circuit may change an offset value of the first circuit when the switch is operated. In the alternative, the third circuit may short-circuit the first circuit, so as to disable its operation when the switch is operated.

The DC/DC converter also may include a current source for providing a current to offset spike noise current that is applied to the first circuit, which spike noise current is generated by spike noise from the coil when the switch is operated. The third circuit may couple the current source to the first circuit when the switch is operated.

The DC/DC converter could instead include a current source connected to the first circuit, which current source outputs a current to offset a current sensing signal applied to the first circuit as a result of spike noise generated when the switching means is switched. The third circuit may increase the current value of the current source when the switching means is switched.

Preferably, the third circuit operates when the switch is switched from OFF to ON. Further, the second circuit and the third circuit may be integrally formed.

The DC/DC converter may include a voltage sensing means for outputting a voltage difference signal between the voltage sensing signal responsive to the output voltage of the DC/DC converter and a predetermined voltage value. The second circuit may control the switch in compliance with the voltage difference signal when the current sensing signal is less than a predetermined current value. The second circuit may turn off the switch if the current sensing signal is greater than the predetermined current value.

Each of the additional features disclosed above and below may be utilized separately or in conjunction with other features to provide improved DC/DC converters and methods for making and using the same. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative and preferred embodiments of the invention.

Figure 1:
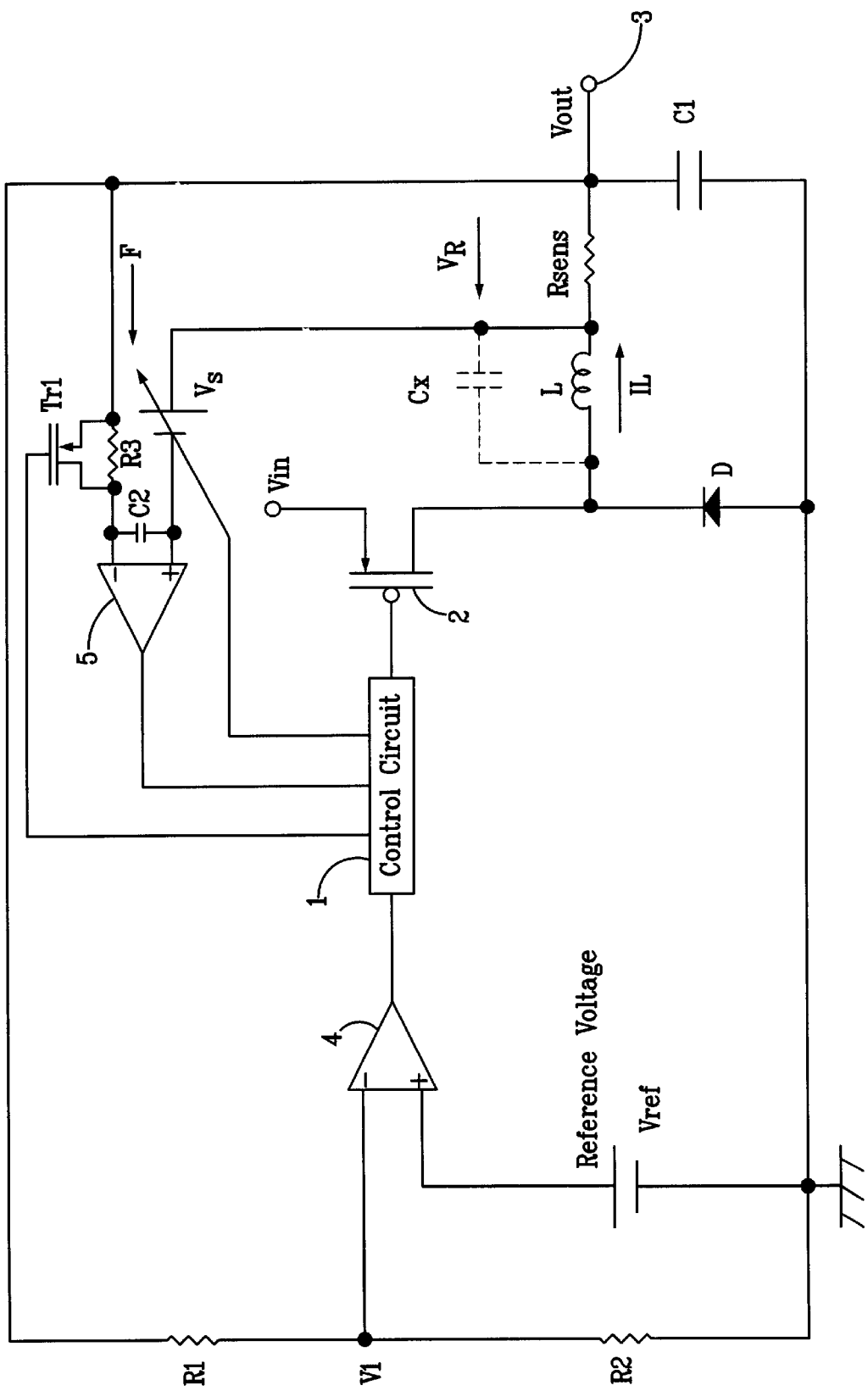
FIG. 1 is a circuit diagram of a first representative embodiment of the invention.

FIG. 1 shows a detailed circuit diagram of a first representative embodiment of an improved DC/DC converter which has a control circuit 1, a switch or switching element 2, such as an MOS type electric field effect transistor (MOSFET), a coil L, a current sensing resistance or resistor Rsens, a differential amplification circuit or differential amplifier 4, and a comparison circuit or a comparator 5.

When the switching element 2 is biased on in this DC/DC converter, current IL flows via the switching element 2, coil L, and through the current sensing resistance Rsens from a DC voltage source Vin. On the other hand, when the switching element 2 is biased off, the DC voltage source is de-coupled from the coil L and instead, current IL flows by discharge of energy accumulated in the coil L. The capacitor C1 acts as a filter to smooth the current IL and couples the output voltage Vout from an output terminal 3 to a load. Vout is also fedback to the differential amplifier 4.

The differential amplifier 4 outputs to the control circuit 1 a voltage signal based upon the difference between (1) voltage V1, which is obtained by dividing the output voltage Vout by resistors R1 and R2, and (2) reference voltage Vref. The comparator 5 outputs a low signal [L] when the voltage drop VR generated at the current sensing resistance Rsens becomes larger than the reference voltage VS by current IL flowing in the coil L. The comparator outputs a high signal [H] when the voltage drop VR becomes less than the reference voltage VS. When the output of the comparator 5 is [H], the control circuit 1 outputs to the gate of the switching element 2 a control signal of a duty ratio responsive to the signal generated by the differential amplification circuit 4. Thus, the switching element 2 is biased on and off in compliance with the duty ratio of the control signal. Furthermore, when the output of the comparator 5 is [L], the control circuit 1 outputs to the gate of the switching element 2 a control signal that biases off the switching element 2. As described above, the differential amplifier 4 operates a voltage controlling circuit that controls the output voltage, and the comparator 5 operates as a current controlling circuit that limits the current. Because a DC/DC converter according to this representative embodiment is a current control type DC/DC converter, the control circuit 1 adjusts the reference voltage VS in compliance with voltage changes.

An adjustable filter circuit F comprises a resistor R3 and a capacitor C2, both of which are connected to the input side of the comparator 5 in parallel with a switching element Tr1, such as an MOS type electric field effect transistor (MOSFET). When the switching element Tr1 is turned off, the Vout is applied to the comparator via resistor R3. In this case, the time constant of the adjustable filter is relatively high and therefore, the response speed of the comparator 5 is relatively slow. On the other hand, when the switching element Tr1 is turned on, Vout is directly connected to the input side of the comparator 5 via switching element Tr1, which preferably has low resistance. In this case, the time constant of the adjustable filter is relatively low and therefore, the response speed of the comparator 5 is relatively fast.

In the DC/DC converter illustrated in FIG. 1, spike noise resulting from the parasitic capacitance Cx of the coil L occurs when the switching element 2 is switched (from OFF to ON or from ON to OFF), as was also the case with respect to the known DC/DC converter shown in FIG. 6. In particular, if the level of spike noise SPon occurring when the switching element 2 is switched from OFF to ON is large, the current IL flowing in the coil L and the current sensing resistance Rsens instantaneously becomes large. In this case, because the switching element 2 is turned off immediately after it is turned on, a possibility exists that the output voltage Vout will not be increased in spite of the fact that the voltage V1 (obtained by dividing the output voltage Vout) is less than the reference voltage Vref. Therefore, in this representative embodiment, any instantaneous change of the input signal of the comparator 5 can be absorbed by the filter of resistor R3 and a capacitor C2, if switching element Tr1 is switched off.

However, if no shunt path to bypass resistor R3 is provided to the input side of the comparator 5, the response speed of the comparator 5 will be relatively slow for usual operating conditions. Therefore, switching element Tr1 is preferably switched off only when switching element 2 is switched from OFF to ON. As noted above, switching element Tr1 is connected in parallel to the resistor R3 and the switching element Tr1 is controlled by the control circuit 1. The control circuit 1 turns off the switching element Tr1 under usual operating conditions and turns on the switching element Tr1 for a predetermined period of time when the switching element 2 is switched from OFF to ON. The predetermined period of time is preferably a period of time during which the output signal of the comparator 5 does not change from [H] to [L] as a result of spike noise generated when the switching element 2 is switched.

As mentioned above, when switching the switching element 2 from OFF to ON, the response speed of the comparator 5 is preferably relatively slow. Therefore, a filter having a larger time constant is preferably connected to the input side of the comparator 5. Thus, switching element Tr1 is preferably biased off when the switching element 2 is switched from OFF to ON. Therefore, even though significant spike noise may be inputted into the comparator 5 as a result of switching element 2, the output of the comparator 5 does not change to [L]. On the other hand, the response speed of the comparator 5 is preferably relatively fast during usual operating conditions. Therefore, a filter having a small time constant (preferably near zero) can be connected to the input side of the comparator 5 during all periods of time other when the switching element 2 is switched. Thus, switching element Tr1 is preferably biased on when switching element 2 is not being switched.

Furthermore, as shown in FIG. 7, positive spike noise SPon occurs when the switching element 2 is switched from OFF to ON and negative spike noise SPoff occurs when the switching element 2 is switched from ON to OFF. However, even though the spike noise SPoff occurs when the switching element 2 is switched from ON to OFF, the output voltage of the comparator 5 does not become [L]. In this case, as long as the differential amplifier 4 continues to operate normally, the output voltage Vout will be the reference voltage. Therefore, it may be acceptable to simply prevent the output of the comparator 5 from changing from [H] to [L], as a result of spike noise occurring when the switching element 2 is switched from OFF to ON.

Figure 2:
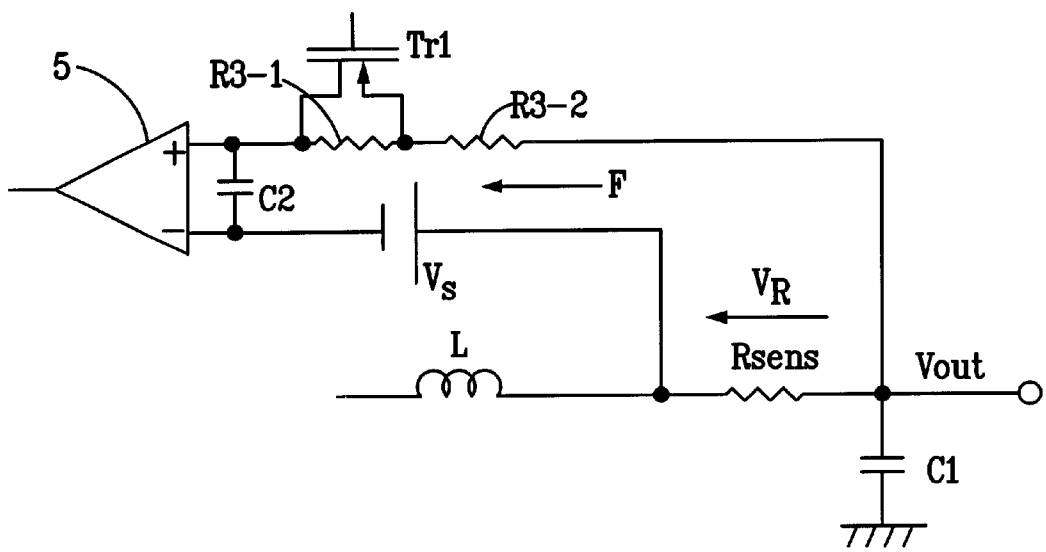
FIG. 2 is a circuit diagram of significant aspects of a second representative embodiment of the invention.

FIG. 2 is a circuit diagram of significant aspects of a second representative embodiment of a DC/DC converter. For the sake of simplicity, identical elements from FIG. 1 have not been repeated. Therefore, FIGS. 1 and 2 should be viewed together when considering an entire representative circuit.

In the second representative embodiment illustrated in FIG. 2, the configuration of the filter F according to the first representative embodiment illustrated in FIG. 1 has been slightly modified. In this case, a filter F comprising resistors R3-1, R3-2 and a capacitor C2 is connected to the input side of the comparator 5. Furthermore, the switching element Tr1 is connected in parallel to the resistor R3-1. The control circuit 1 again biases on the switching element Tr1 for a predetermined period of time when the switching element 2 is switched from OFF to ON, and biases off the switching element Tr1 in all periods of time other than when the switching element is switched from OFF to ON.

In this representative embodiment, when the switching element Tr1 is turned off resistors R3-1, R3-2 and capacitor C2 are connected to the input side of the comparator 5. Preferably, the adjustable filter F has a large time constant in this configuration. On the other hand, when the switching element Tr1 is switched ON, a shunt path around resistor R3-1 is provided so that effectively only resistor R3-2 and capacitor C2 are connected to the input side of the comparator 5. Preferably, the adjustable filter F has a small time constant in this configuration.

More preferably, the time constant of the filter comprising resistor R3-2 and capacitor C2 and the predetermined period of time during which the switching element Tr1 is switched ON are set to values that prevent the output of the comparator 5 from becoming [L] as a result of spike noise occurring when the switching element 2 is switched from OFF to ON. Thus, while the second representative embodiment utilizes different components from the first representative embodiment, this circuit also prevents the output of comparator 5 from changing due to spike noise occurring when the switching element 2 is switched.

Figure 3:
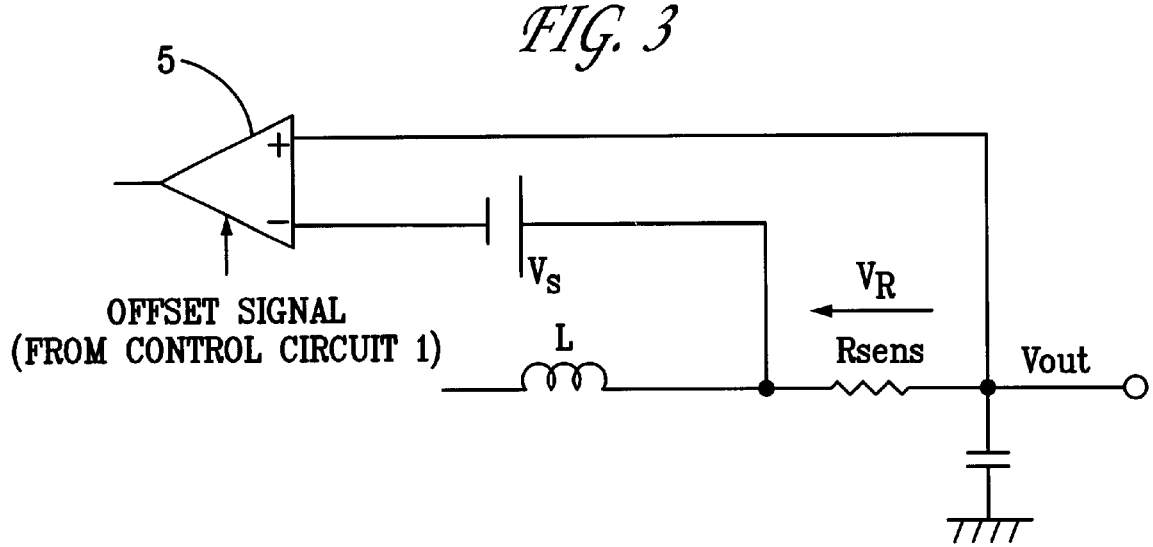
FIG. 3 is a circuit diagram of significant aspects of a third representative embodiment of the invention.

FIG. 3 is a circuit diagram of significant aspects of a third representative embodiment of a DC/DC converter. Again, FIGS. 1 and 3 should be consulted together to visualize a complete circuit. In the third representative embodiment, comparator 5 utilizes a variable offset value. Also, the control circuit 1 outputs an offset signal to the comparator 5 for a predetermined period of time when the switching element 2 is switched from OFF to ON, but does not output any offset signal to the comparator 5 during any time other than this period. The comparator 5 sets the offset value to a lesser value when no offset signal is outputted from the control circuit 1, and sets it to a larger value when an offset signal is outputted therefrom.

In this representative embodiment, the comparator 5 changes the output signal from [H] to [L] when the voltage drop VR of the current sensing resistance Rsens becomes greater than the value obtained by adding the offset value to the reference voltage VS. That is, the reference voltage VS will have been set to a higher value when the offset signal is outputted from the control circuit 1. Thus, even though spike noise occurs when the switching element 2 is switched from OFF to ON, the output signal of the comparator 5 does not change to [L]. The offset value of the comparator 5 when the switching element 2 is switched from OFF to ON and a predetermined period of time when an offset value is outputted to the comparator 5 are set to values at which the output signal of the comparator 5 does not change to [L] due to spike noise occurring when the switching element 2 is switched from OFF to ON.

Figure 4:
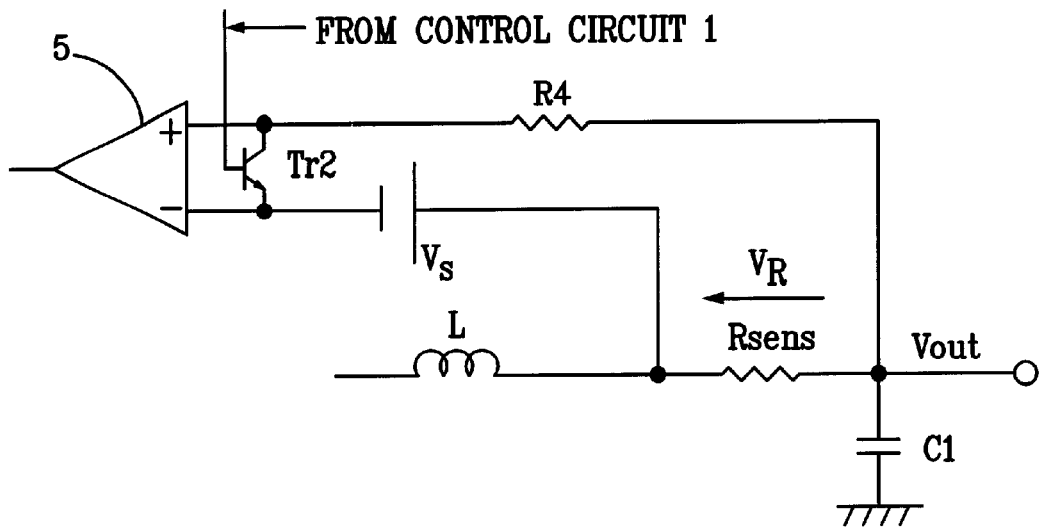
FIG. 4 is a circuit diagram of significant aspects of a fourth representative embodiment of the invention.

FIG. 4 is a circuit diagram of significant aspects of a fourth representative embodiment of a DC/DC converter and is shown in the same manner as FIGS. 2 and 3. In the fourth representative embodiment, a switching element Tr2, such as a transistor, can connect the input terminals of the comparator 5. The control circuit 1 biases on the switching element Tr2 during a predetermined period of time when the switching element 2 is switched from OFF to ON, and turns off the switching element Tr2 for the remainder of time.

In this embodiment, because the input terminals of comparator 5 have been short-circuited when the switching element Tr2 is switched on, the output of the comparator 5 is maintained [H]. Therefore, even though spike noise occurs when the switching element 2 is switched from OFF to ON, the output of the comparator 5 does not change to [L]. Preferably, the predetermined time when the switching element Tr2 is switched on is a time period that is appropriate to prevent the output of the comparator 5 from changing to [L] as a result of spike noise occurring when the switching element 2 is switched from OFF to ON.

Figure 5:
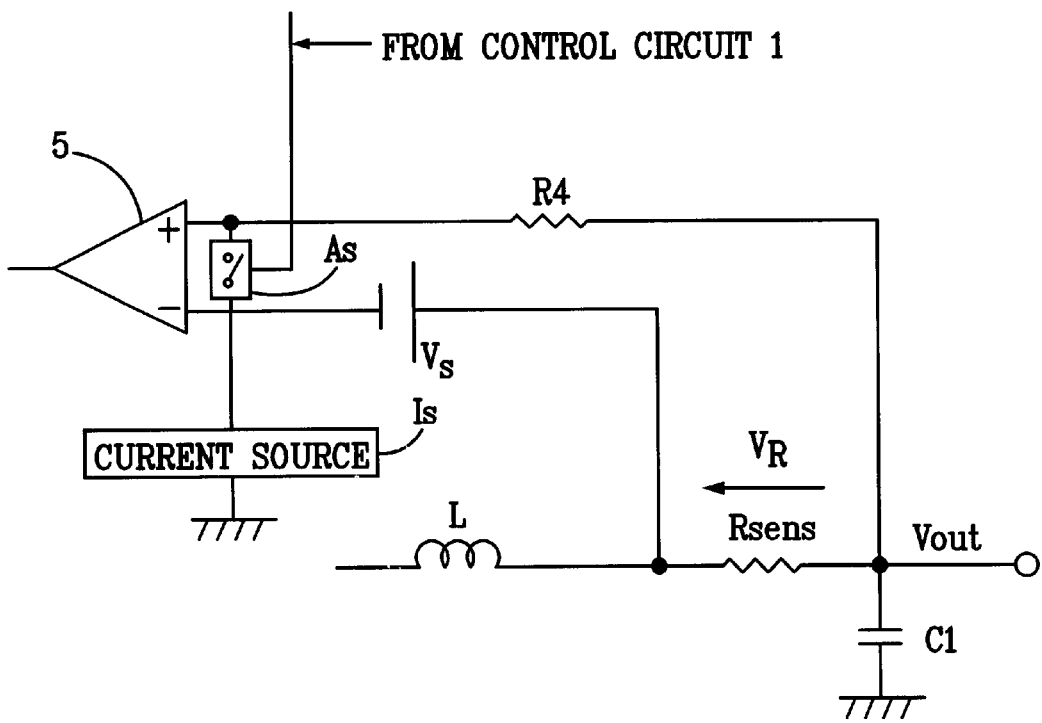
FIG. 5 is a circuit diagram of significant aspects of a fifth representative embodiment of the invention.

FIG. 5 is a circuit diagram of significant aspects of a fifth representative embodiment of a DC/DC converter and is shown in the same manner as FIGS. 2, 3 and 4. In the fifth representative embodiment, a current source IS is connected to an input terminal of the comparator 5 via a switch AS. The current source IS provides a current to offset the voltage drop generated in the current sensing resistance Rsens as a result of spike noise occurring when the switching element 2 is switched from OFF to ON. The control circuit 1 turns on the switch AS for a predetermined period of time when the switching element 2 is switched from OFF to ON, and turns off the switch AS for all other periods of time.

In this representative embodiment, when the switch AS is on, the output of the comparator 5 changes from [H] into [L] as the voltage drop VR across the current sensing resistance Rsens becomes larger than the reference voltage VS as a result of the current IL flowing in the coil L and the current provided by the current source IS. The current provided by the current source IS preferably offsets the voltage drop generated across the current sensing resistance Rsens as a result of spike noise occurring when the switching element 2 is switched from OFF to ON.

Therefore, even though spike noise occurs when the switching element 2 is switched from OFF to ON, the voltage drop generated in the current sensing resistance Rsens does not become great. That is, when the switch AS is turned on and current is provided by the current source IS, the current sensing sensitivity of the current sensing resistance Rsens is reduced. Thus, even though spike noise is generated when the switching element 2 is switched from OFF to ON, the output of the comparator 5 does not change to [L]. The current value of the current source IS and the predetermined time when the switch AS is turned on are set to values at which the output of the comparator 5 will not change to [L] due to spike noise occurring when the switching element 2 is switched from OFF to ON.

The switch AS it not essential to this embodiment. Instead, the current value of the current source IS can be controlled by the control circuit 1. The control circuit 1 sets the current value of the current source IS to an predetermined value at an predetermined time when the switching element 2 is switched from OFF to ON, and in a period of time other than the above, the current value of the current source IS is set to a value less than the predetermined value, for example, zero.

In the above-mentioned representative embodiments, DC/DC converters were described that control the output voltage (Vout) by controlling the switching of switching element 2. However, the teachings of the present specification are applicable to a variety of DC/DC converters. For example, as shown in FIG. 8, DC/DC converters that are part of synchronous rectifiers can be operated to alternately control the switching of two switching elements 2a and 2b.

Figure 8:
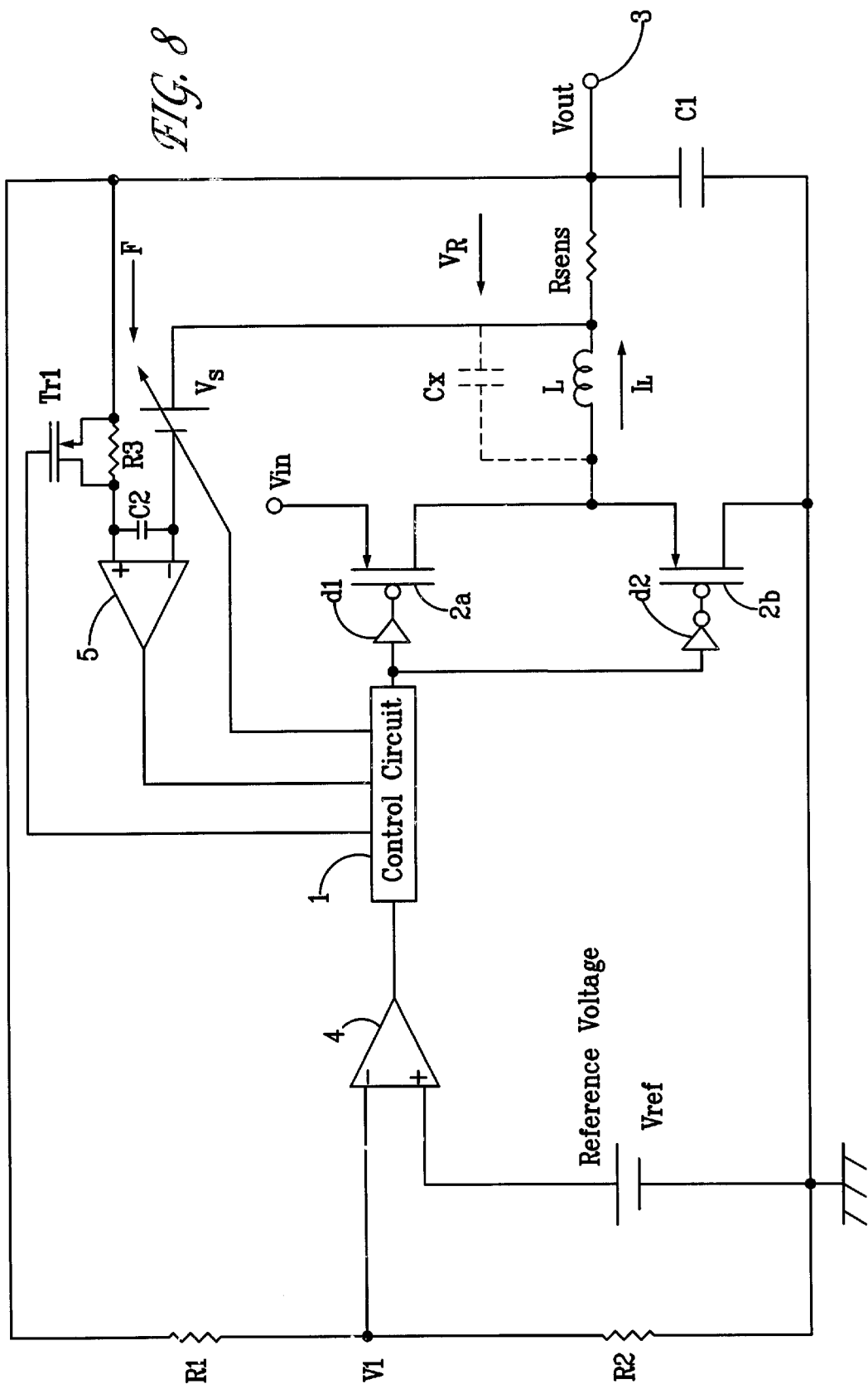
FIG. 8 is a circuit diagram of a sixth representative embodiment of the invention.

In FIG. 8, d1 is an amplifier and d2 is an inverter. DC/DC converters shown in FIG. 8 are different from DC/DC converters shown in FIG. 1 in respect that the diode D is replaced with a switching element 2b.

Furthermore, the same teachings are applicable to DC/DC converters in which a variety of switching elements other than the above-mentioned MOSFET can be used as the switching element 2. In particular, a variety of switches or switching elements may be used in place of the switching elements Tr1, Tr2 and the switch AS.

In addition, current-control type DC/DC converters were described that regulate the reference voltage VS in compliance with a voltage difference. However, the present teachings also are applicable to a voltage-control type DC/DC converter in which the reference voltage is fixed.

Moreover, the first through the sixth representative embodiments describe DC/DC converters that perform voltage control and current control. However, the present teachings also are applicable to DC/DC converters that perform only current control.

In the above-mentioned representative embodiments, a description was given of the case of avoiding influences resulting from spike noise SPon occurring when the switching element 2 is switched from OFF to ON. Furthermore, such a configuration may be available, in which influences are avoided, which result from spike noise SPoff occurring when the switching element 2 is switched from ON to OFF. In this case, the configuration of the respective circuits is changed in compliance with the polarity and level of spike noise SPoff.

In the above-mentioned representative embodiments, the comparator 5 changes an output signal from [H] to [L] when a voltage drop VR becomes greater than a reference voltage VS. Furthermore, such a configuration may be available, in which the comparator 5 changes an output signal from [L] to [H] when a voltage drop VR becomes smaller than a reference voltage VS.

What is claimed is:

1. A DC/DC converter comprising:
    a switch;
    a coil coupled to the switch;
    a comparator that compares a current sensing signal responsive to a current flowing through the coil with a set current value;
    controlling means for controlling the switch based upon an output signal generated by the comparator; and
    changing means for preventing an output of the comparator from changing as a result of spike noise that occurs when the switch is switched, wherein the changing means is made active when the switch is switched.

2. A DC/DC converter as set forth in claim 1, wherein the changing means delays the response speed of the comparator when the switch is switched.

3. A DC/DC converter as set forth in claim 2, wherein the changing means comprises an adjustable filter circuit connected to the input side of the comparator, wherein the time constant of the adjustable filter circuit is increased when the switch is switched.

4. A DC/DC converter as set forth in claim 1, wherein an offset signal is input to the comparator when the switch is switched.

5. A DC/DC converter as set forth in claim 1, wherein the input side of the comparator is shorted when the switch is switched.

6. A DC/DC converter as set forth in claim 1, wherein said changing means includes a current source for outputting a current that offsets the current sensing signal input to the comparator as a result of spike noise generated when the switch is switched, wherein the current source is connected to the comparator when the switch is switched.

7. A DC/DC converter as set forth in claim 1, wherein said changing means includes a current source connected to the comparator, the current source outputting a current that offsets a current sensing signal input to the comparator as a result of spike noise generated when the switch is switched, wherein the controlling means increases the current value of the current source when the switch is switched.

8. A DC/DC converter as set forth in claim 1, wherein the changing means operates only when the switch is switched from OFF to ON.

9. A DC/DC converter as set forth in claim 1, wherein the changing means and the controlling means are integrally formed.

10. A DC/DC converter as set forth in claim 1, further comprising a voltage sensing means for outputting a voltage difference signal based upon the difference between a voltage sensing signal that is responsive to an output voltage of the DC/DC converter and a voltage set value, wherein the voltage difference signal is supplied to the controlling means and the controlling means controls the switch based upon the voltage difference signal and the output signal generated by the comparator.

11. A DC/DC converter comprising:
a switching element;
a coil connected to the switching element;
a comparator that compares a current sensing signal responsive to a current flowing through the coil with a set current value;
a control circuit that controls the switching element on the basis of the output signal of the comparator; and
a changing circuit that prevents the comparator from functioning improperly as a result of spike noise generated when the switching element is switched from OFF to ON, wherein the changing circuit is made active when the switching element is switched from OFF to ON.

12. A DC/DC converter comprising:
a switch,
a coil coupled to the switch,
a first circuit having at least two inputs that compares a current flowing through the coil with a predetermined current value,
a second circuit that communicates switching signals to the switch based upon an output signal generated by the first circuit and
a third circuit that prevents the first circuit from functioning improperly as a result of spike noise generated by the switch, the third circuit being coupled to the first circuit at the time the switch is switched and not being coupled to the first circuit at times other than at the time the switch is switched.

13. A DC/DC converter as in claim 12 wherein the third circuit suppresses a spike voltage associated with spike noise, but does not substantially cause the DC/DC converter to function improperly.

14. A DC/DC converter as in claim 12 wherein the third circuit comprises an adjustable filter having an adjustable time constant, wherein the adjustable time constant of the adjustable filter is increased when the switch is switched.

15. A DC/DC converter as in claim 12 wherein the third circuit supplies an offset signal to the first circuit when the switch is switched.

16. A DC/DC converter as in claim 12 wherein the third circuit disables the first circuit when the switch is switched.

17. A DC/DC converter as in claim 12 wherein the third circuit supplies an offset current to an input of the first circuit when the switch is switched.

18. A DC/DC converter as in claim 12, wherein the third circuit comprises a second switch coupled to the inputs to the first circuit and the inputs of the first circuit are shorted only when the switch is switched.

19. An apparatus comprising:
a power supply,
a coil,
a switch coupling the power supply to the coil,
a comparator having at least two inputs that generates an output signal based upon a signal representative of an output voltage generated by the coil and a first reference signal,
a differential amplifier that generates an output signal based upon a signal representative of the output voltage generated by the coil and a second reference signal,
a control circuit coupled to the switch, comparator and differential amplifier, wherein the control circuit supplies a variable duty cycle signal to the switch and the variable duty cycle signal is determined based upon the output signals generated by the comparator and the differential amplifier, and
means for preventing the comparator output signal from changing due to spike noise caused by switching the switch, the preventing means being made active at the time the switch is switched.

20. An apparatus as in claim 19, wherein the preventing means comprises an adjustable filter having an adjustable time constant, wherein the adjustable time constant of the adjustable filter is increased when the switch is switched.

21. An apparatus as in claim 19, wherein the preventing means comprises an offset signal supply and the offset signal is supplied to the comparator when the switch is switched.

22. An apparatus as in claim 19, wherein the preventing means disables the comparator when the switch is switched.

23. An apparatus as in claim 19, wherein the preventing means supplies an offset current to one input of said inputs to the comparator when the switch is switched.

24. An apparatus as in claim 19, wherein the preventing means comprises a switch coupled to the inputs of the comparator, wherein the inputs of the comparator are shorted together when the switch is switched.

25. An apparatus as in claim 19, wherein the preventing means comprises means for suppressing a spike voltage associated with spike noise caused by switching the switch, but the preventing means does not substantially cause the apparatus to function improperly when the switch is not being switched.

26. An apparatus comprising:
a power supply,
a coil,
a switch coupled to the power supply and the coil,
means for generating a binary output signal based upon a signal representative of an output voltage generated by the coil and a first reference signal, said means for generating a binary output signal having at least two inputs,
means for generating an analog output signal based upon a signal representative of the output voltage generated by the coil and a second reference signal,
means for generating a duty cycle signal based upon the binary output signal and the analog output signal, the duty cycle signal being supplied to the switch and thereby intermittently coupling the power supply to the coil, and means for preventing the binary output signal from changing as a result of spike noise that occurs when the switch transitions between one of (1) from an ON state to an OFF state and (2) from an OFF state to an ON state, wherein the preventing means operates only when the switch is transitioning between states.

27. An apparatus as in claim 26, wherein the preventing means comprises means for increasing a filter time constant when the switch is transitioning between states.

28. An apparatus as in claim 26, wherein the preventing means comprises means for disabling the binary output signal generating means when the switch is transitioning between states.

29. An apparatus as in claim 26, wherein the preventing means comprises means for supplying an offset signal to the binary output signal generating means when the switch is transitioning between states.

30. An apparatus as in claim 26, wherein the preventing means comprises means for coupling the inputs of the binary output signal generating means when the switch is transitioning between states.

31. An apparatus as in claim 26, wherein the preventing means comprises means for suppressing a spike voltage associated with spike noise caused by the switch transitioning between states, but the preventing means does not substantially cause the apparatus to function improperly when the switch is not transitioning between states.

* * * * *